Feb. 24, 1942.　　　　P. EWALD　　　　2,273,850
SPECIFIC GRAVITY RECORDING SYSTEM
Filed Oct. 14, 1940　　　2 Sheets-Sheet 1

Philip Ewald
INVENTOR

BY Arthur R. Davis
ATTORNEY

Feb. 24, 1942.  P. EWALD  2,273,850

SPECIFIC GRAVITY RECORDING SYSTEM

Filed Oct. 14, 1940  2 Sheets—Sheet 2

Philip Ewald
INVENTOR

BY Arthur L. Davis
ATTORNEY

Patented Feb. 24, 1942

2,273,850

UNITED STATES PATENT OFFICE 2,273,850

SPECIFIC GRAVITY RECORDING SYSTEM

Philip Ewald, Sheffield, Ala.

Application October 14, 1940, Serial No. 361,120

2 Claims. (Cl. 265—44)

(Granted under the act of March 3, 1883, as amended April 30, 1928; 370 O. G. 757)

The invention herein described may be manufactured and used by or for the Government for governmental purposes without the payment to me of any royalty thereon.

This invention relates to a method of and apparatus for determining a fluid condition, such as the specific gravity of a liquid, and more particularly, this invention relates to a method and apparatus for determining the specific gravity of a liquid at a standard temperature condition even though the temperature of the liquid varies from time to time.

One of the objects of this invention is to provide an improved and simplified specific gravity recording system which is easily protected against corrosion. A more specific object of the invention is to provide an indicating coil for measuring a float position said indicating coil comprising one leg of a Wheatstone bridge which has a galvanometer and mechanism adapted to indicate, record and restore potential impressions initiated by the float. Another object of this invention is to provide a means for compensating for changes in specific gravity of the liquid being measured due to changes in temperature. A still further object of this invention is to provide a specific gravity recording system readily adaptable to automatic process control.

I have discovered an apparatus for measuring a solution concentration having in combination, an alternating current Wheatstone bridge, a variable indicating inductance in an arm of the bridge, a variable measuring inductance in an arm of the bridge connected to the variable indicating inductance in juxtaposition with an element directly responsive to changes in density of said solution forming a conjugation, means for rectifying the alternating current of the bridge, a temperature sensitive resistance in an arm of the bridge subjected to temperature variations corresponding with variations in temperature of the solution, a resistance in an arm of the bridge connected to the rectifying means and the temperature sensitive resistance and forming a conjugation, and a direct current galvanometer connected to the conjugations of the bridge.

In the accompanying drawings, which form a part of the specification, and wherein reference symbols refer to like parts wherever they occur, Fig. 1 is a schematic diagram of the measuring circuit of the invention.

Figure 1:
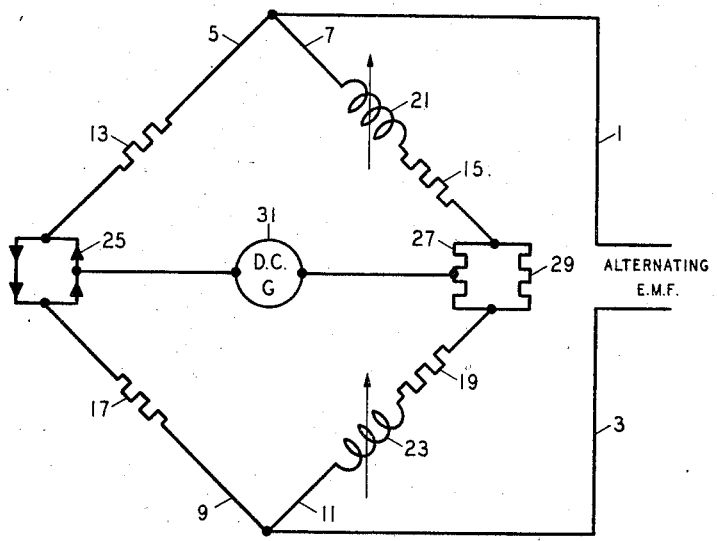

In Fig. 1, conductor 1 and conductor 3 supply an alternating electromotive force, e.m.f. to a Wheatstone bridge which comprises in each of the four bridge arms, the conductors 5, 7, 9, 11 and the resistances 13, 15, 17, 19. Conductor 7 and resistance 15 have connected in circuit therewith a variable measuring inductance 21. Conductor 11 and resistance 19 have connected in circuit therewith a variable indicating inductance 23. A plurality of rectifiers, represented by rectifier 25, are interposed at the conjugation of conductors 5 and 9. A resistance 27 and a resistance 29 connected in parallel are interposed at the conjugation of conductors 7 and 11. A direct current galvanometer 31 has one terminal connected to the plurality of rectifiers, represented by rectifier 25, and the other terminal connected to the resistance 27. The plurality of rectifiers, represented by rectifier 25, is arranged so that two of the rectifiers impart the proper polarity to the direct current galvanometer and two other rectifiers are utilized as balancing rectifiers thereby eliminating polarization. These rectifiers are preferably of the copper oxide type. It is readily seen that the fundamental circuit embraces the balance principle and operates in a manner well known in the art with the exception of using an alternating current Wheatstone bridge and a direct current galvanometer in association with variable inductances. These exceptional features will be set forth in detail in Fig. 2 and Fig. 3 following.

Figure 2:
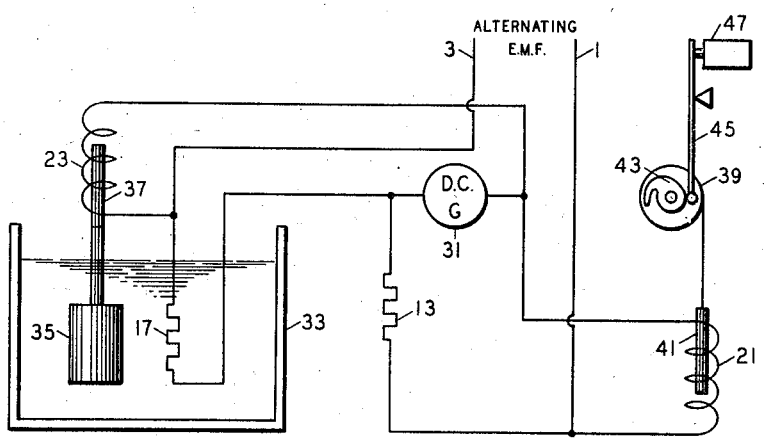
Fig. 2 is a diagrammatic view, illustrating essential apparatus features.

In Fig. 2 a vessel 33 containing liquid concentration has a float 35 immersed therein. The indicating inductance 23 has an iron core 37 which is rigidly secured to the float 35 and is responsive to any movement of said float. The resistance 17 in juxtaposition to the float 35 is likewise immersed in the liquid concentration. In view of the fact that resistance 17 is a temperature sensitive resistance closely associated with the float 35, it exactly compensates for the change in temperature of the liquid concentration and the effect of such temperature change on the float position. The fundamental circuit as shown in Fig. 1 includes a Wheatstone bridge but the rectifiers and certain of the resistances have been eliminated for simplicity of illustration. The bridge is properly balanced by resistances 13 and 17 in association with inductances 21 and 23 wherein suitable recording and balancing mechanism represented by 39 actuates the iron core 41 of measuring inductance 21. All of the resistances in the bridge are non-inductive and the alternating e.m.f. is of such low value that forces on the iron cores of the inductances, due to current, are eliminated. A control cam 43 integral with the balancing mechanism, represented by 39, actuates suitable linkage, represented by 45, which in turn actuates a primary pilot valve 47 connected to suitable pneumatic control (not shown). The type of control is dependent of course on the particular process to be controlled, the throttling range desired and the droop-characteristic. Numerous controls well known in the art are adaptable to the present invention.

Figure 3:
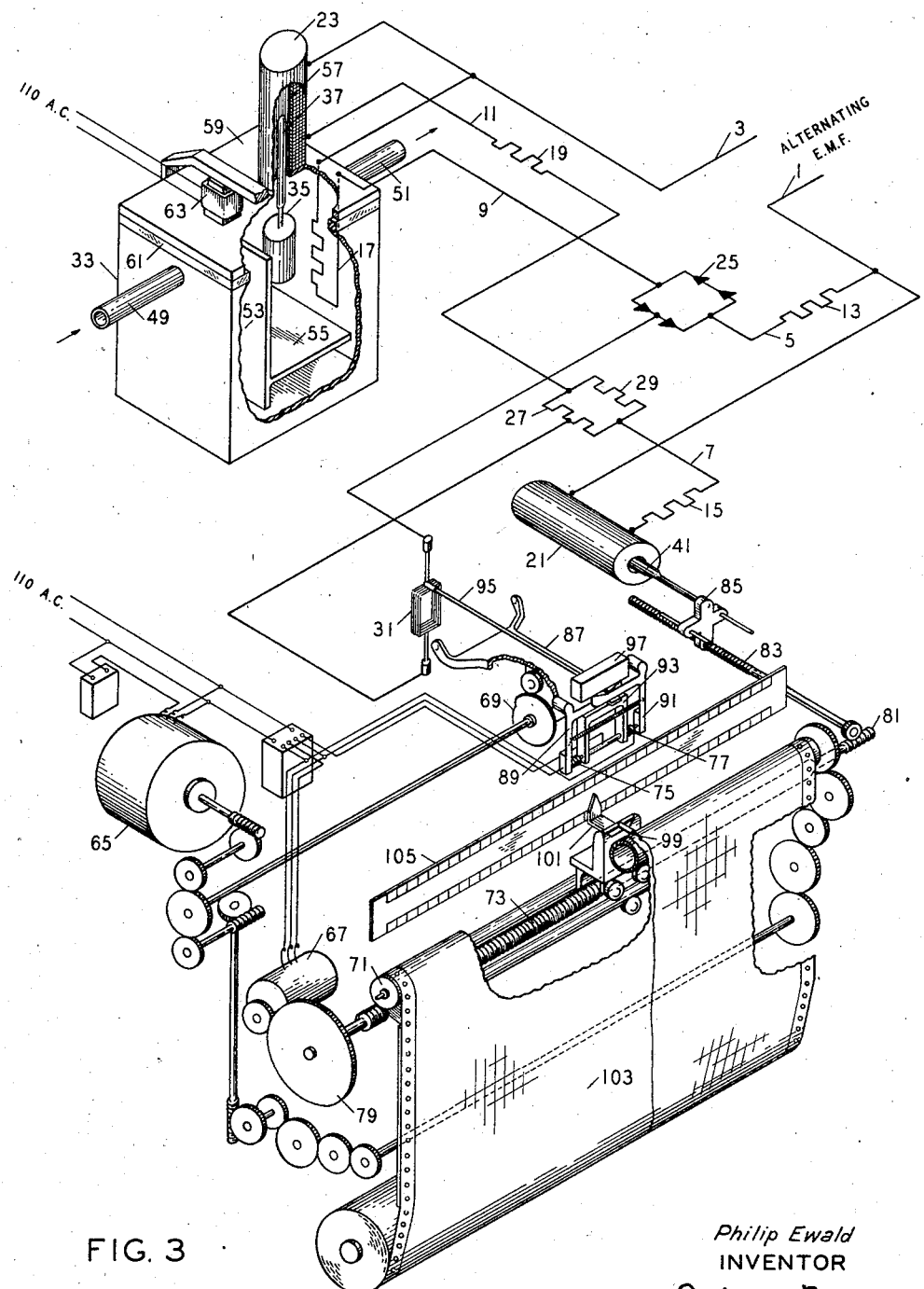
Fig. 3 is an isometric view, illustrating circuits and apparatus in a preferred embodiment of the invention.

In Fig. 3 a vessel 33 has an inlet 49 and an outlet 51 for liquid concentration so arranged as to maintain a predetermined depth of liquid within the vessel. A liquid directing plate 53 rigidly secured to the sidewalls of vessel 33 and extending transversely thereof, shields the float 35 from direct contact with liquid entering the vessel 33 through inlet 49. A liquid deflecting plate 55 formed integrally with plate 53 extends at right angles thereto near the bottom of vessel 33 and in combination with directing plate 53 creates a zone wherein the liquid has relatively small movement and into which one end of the float 35 extends. The other end of the float 35, which is provided with the iron core 37, is movably received in and guided by a casing member 57 of non-magnetic material which has its upper end closed. The lower open end of casing 57 is secured to the top 59 of vessel 33 and the float 35 extends through the top 59 into the casing 57 thereby sealing the vessel 33. The indicating inductance 23 surrounds the casing member 57 and is likewise rigidly secured to the top 59 of vessel 33. The top member 59 of vessel 33 is insulated from the body member of said vessel by a resilient gasket 61 which enables the top 59 to vibrate with the force exerted by the alternating current electromagnet 63. This vibratory movement prevents the float 35 from sticking within the inductance 23 and further insures uniform operation. The temperature sensitive resistance 17 is in juxtaposition to float 35 and is immersed in the liquid within the vessel 33. Having described the indicating apparatus in detail the operating mechanism will now be described as the entire apparatus is coordinated. The driving means for operating the gravity recorder mechanism comprises an electric motor 65 and an electric motor 67 connected to a suitable source of alternating current. Motor 65 is of the constant speed type and runs continuously driving cam 69 and the chart moving platen 71. Motor 67, running intermittently, actuates the lead screw 73. Motor 67 is energized and operates whenever either contact 75 or contact 77 is open but is at rest when both contacts are simultaneously open or closed. When contact 75 is open motor 67 rotates in one direction and, through gear 79 and the lead screw 73, drives worm 81 which in turn actuates screw 83. A crossarm 85, threadedly affixed to screw 83, has an iron core 41 rigidly secured thereto which mechanism moves the iron core 41 within the measuring inductance 21 in one direction. When contact 77 is open motor 67 rotates in the reverse direction and through the above mentioned mechanism the iron core 41 is moved in the opposite direction from that when contact 75 was open. Motor 67 operates in association with the galvanometer 31, when an unbalanced condition of e.m.f. exists resulting from a change in the indicating inductance 23, as caused by a change in specific gravity, the core 41 of the measuring inductance 21 is moved by motor 67 in conjunction with the previously described actuating mechanism to a position that will restore a condition of balance in the bridge and return the galvanometer pointer to its normal zero position.

The direction and magnitude of the horizontal deflection of the galvanometer determines which contact 75 or 77 shall open and the length of time it shall stay open as the cam 69, driven from motor 65 rotates at a constant speed to raise and lower, once every revolution, table 87 on which are mounted the two contacts 75 and 77, and the chopper arms 89 and 91. This principle is well known in the art and is employed in Bristol type recording instruments. There are several well known balancing mechanisms available, any one of which may be satisfactorily adapted to the present invention. However, for this particular embodiment Bristol type balancing mechanism will be described in conjunction with the invention.

As the table 87 rises, arm 93 gently clamps the galvanometer pointer 95 in its free horizontal position against the bottom of the pointer stop 97. As the table 87 continues to rise, chopper arms 89 and 91 move upward toward the pointer 95 and are both engaged by the pointer and depressed before the table 87 reaches its highest point of travel. The shape of each chopper arm is such that both chopper arms touch the pointer at the same time only when the galvanometer is in the zero position. For any other position either chopper arm 89 or 91, depending upon the position of the pointer, touches the pointer first and is depressed first. Since the cam 69 rotates continuously the table 87 is continuously rising and falling, bringing the chopper arms 89 and 91 into contact with the pointer 95 at frequent intervals.

When the bridge circuit is in a balanced condition and the pointer 95 is in the zero position both chopper arms 89 and 91 lightly touch the pointer 95 and as the table 87 continues to rise, the chopper arms are depressed, opening contacts 75 and 77 at the same time. As the cam 69 continues to rotate, the table 87 reaches its upper limit of travel and begins to fall, finally reaching a point in the cycle where both contacts 75 and 77 close again at the same time. Since the motor 67 does not run when the contacts 75 and 77 are both open or both closed, the iron core 41 remains stationary, when the galvanometer 31 is at the zero position, showing that a balanced e.m.f. condition exists in the bridge circuit and that no adjustment of inductance 21 is needed.

When the specific gravity of the liquid within vessel 33 changes, the float 35 changes position likewise altering position of the iron core 37 which changes the e.m.f. passing through inductance 23. This change in e.m.f. immediately deflects the galvanometer, moving the pointer 95 away from the zero position an amount proportional to the magnitude of the specific gravity change. With the pointer 95 in the new position either chopper arm 89 or 91, depending upon which side of zero the pointer swings, touches the pointer first, which results in contact 75 being open longer than contact 77 or vice versa and causes the motor 67 to change the position of the iron core 41 within the inductance 21 to restore e.m.f. balance in the bridge circuit.

That portion of the chopper arms 89 and 91 that comes in contact with pointer 95 is shaped so as to make the extent of the corrective action each time the table rises proportional to the magnitude of the pointer deflection. An infinitesimal deflection of the galvanometer 31 thus causes the iron core 41 to respond, and a larger deflection produces a large corrective action, proportional to the deflection. The fact that the degree of unbalance in the bridge circuit determines the amount of correction that will result each time the table 87 rises accounts for the rapidity with which balance is restored.

A recording pen 99 and indicating pointer 101 are mounted on the lead screw 73 and are moved across a driven graduated chart 103 and indicating scale 105 in cooperation with the position change of iron core 41. This particular arrangement eliminates backlash errors that result, when the iron core 41 is not mounted integrally with the recording and indicating mechanism.

Conductor 1 and conductor 3 are energized by an alternating e.m.f. which is supplied from a line-voltage regulator (not shown). The necessary alternating current may also be obtained using a high resistance in series, or through a step-down transformer.

It is evident that there are numerous factors which will influence conditions for the most satisfactory operation of the invention, the actual limits of which cannot be established except by a detailed study of the particular liquid to be recorded with specific emphasis placed on such factors as throttling range and droop correction, relative to control. If, for example, it is desired to design the apparatus for a phosphoric acid concentration range of 1.3 to 1.8 with a temperature variation of 100° C., a scale error of 20% would be produced. To offset this 20% scale error the temperature sensitive resistance 17 would comprise a nickel resistance coil of about 250 ohms. This coil will change resistance about 20% for a 100° C. change in temperature thereby compensating for the scale error.

It will be seen, therefore, that this invention actually may be carried out by the use of various modifications and changes without departing from its spirit or scope, with only such limitations placed thereon as may be imposed by the prior art.

I claim:

1. An apparatus for measuring a solution concentration having in combination (a) an alternating current Wheatstone bridge; (b) a variable indicating inductance in an arm of the bridge having a core member inductively related to the inductance, said core member being integral with a specific gravity float; (c) a variable measuring inductance in an arm of the bridge connected to the variable indicating inductance having a core member inductively related to the measuring inductance, said core member being associated with balancing mechanism; (d) means for rectifying the alternating current of the bridge; (e) a temperature compensating resistance, adapted to be immersed in the solution being measured, in an arm of the bridge; (f) a resistance in an arm of the bridge connected to the rectifying means and the temperature compensating resistance and forming a conjugation; and (g) a direct current galvanometer connected to the conjugation of the bridge.

2. The apparatus according to claim 1 wherein (a) the balancing mechanism varies the measuring inductance in accordance with variation of the indicating inductance and indicates the solution concentration measured and actuates control apparatus.

PHILIP EWALD.